United States Patent
Heino et al.

(10) Patent No.: US 11,419,344 B2
(45) Date of Patent: Aug. 23, 2022

(54) BUTTERMILK

(71) Applicant: VALIO LTD., Helsinki (FI)

(72) Inventors: Antti Heino, Helsinki (FI); Niina Valkonen, Helsinki (FI); Pia Ollikainen, Helsinki (FI)

(73) Assignee: VALIO LTD, Helsinki (FI)

( * ) Notice: Subject to any disclaimer, the term of this patent is extended or adjusted under 35 U.S.C. 154(b) by 314 days.

(21) Appl. No.: 16/622,435

(22) PCT Filed: Jun. 15, 2018

(86) PCT No.: PCT/FI2018/050468
§ 371 (c)(1),
(2) Date: Dec. 13, 2019

(87) PCT Pub. No.: WO2018/229346
PCT Pub. Date: Dec. 20, 2018

(65) Prior Publication Data
US 2020/0205433 A1 Jul. 2, 2020

(30) Foreign Application Priority Data

Jun. 16, 2017 (FI) ...................................... 20175566

(51) Int. Cl.
*A23C 17/00* (2006.01)
*A23C 15/06* (2006.01)
*A23C 9/152* (2006.01)

(52) U.S. Cl.
CPC .............. *A23C 17/00* (2013.01); *A23C 15/06* (2013.01); *A23C 9/1528* (2013.01); *A23C 2210/25* (2013.01); *A23V 2002/00* (2013.01)

(58) Field of Classification Search
CPC ....... A23C 17/00; A23C 15/06; A23C 9/1528; A23C 2210/25; A23V 2002/00
USPC ......................................................... 426/34
See application file for complete search history.

(56) References Cited

U.S. PATENT DOCUMENTS

| 1,513,331 | A | * | 10/1924 | Low | ........................ | A23C 15/06 426/664 |
|---|---|---|---|---|---|---|
| 2007/0104843 | A1 | | 5/2007 | Holst et al. | | |
| 2016/0029645 | A1 | * | 2/2016 | Jimenez-Flores | ..... | A23L 33/115 426/560 |

FOREIGN PATENT DOCUMENTS

| JP | H09173814 A | * 12/1995 |
|---|---|---|
| JP | 2006-158340 | 6/2006 |
| WO | 2006/041316 | 4/2006 |
| WO | 2015/078506 | 6/2015 |
| WO | 2017/064309 | 4/2017 |

OTHER PUBLICATIONS

Translation of JP-H09173814-A (Year: 1995).*
Morin et al., Microfiltration of Buttermilk and Washed Cream Buttermilk for Concentration of Milk Fat Globule Membrane Components, J. Dairy Sci. 90:2132-2140 (2007) (Year: 2007).*
International Search Report for PCT/FI2018/050468 dated Sep. 19, 2018, 5 pages.
Search Report for FI20175566 dated Dec. 22, 2017, 2 pages.
Morin et al., "Microfiltration of buttermilk and washed cream buttermilk for concentration of milk fat globule membrane components", Journal of diary science, accepted Jan. 4, 2007, vol. 90, nr. 5, pp. 2132-2140.
Britten et al., "Effect of cream treatment on phospholipids and protein recovery in butter-making process", International Journal of Food Science & Technology, Apr. 1, 2008, vol. 43, nr. 4, pp. 651-657.
[Online] Database Biosis—Biosciences Information Service, Nov. 2008, Lamothe et al., "Butter making from caprine creams: Effect on washing treatment of phospholipids and milk fat globule membrane proteins distributions", XP002784268, 2 pages.
Lamothe et al., "Butter making from caprine creams: Effect on washing treatment of phospholipids and milk fat globule membrane proteins distributions", Journal of Diary Research, Jul. 14, 2008, vol. 75, pp. 439-443.
Rombault et al., "Analysis of Phospho- and Shphingolipids in Dairy Products by a New HPLC Method", J. Dairy Sci., vol. 88, pp. 482-488.

* cited by examiner

*Primary Examiner* — Brent T O'Hern
(74) *Attorney, Agent, or Firm* — Robert P. Michal, Esq.; Carter, DeLuca & Farrell LLP

(57) ABSTRACT

The present invention relates to a method for producing buttermilk, comprising the steps of: providing raw cream having a fat content in the range of about 35% w/w to about 60% w/w; washing the raw cream with a washing liquid to provide a solution of the raw cream and the washing liquid; separating the washing liquid from the solution to provide washed cream with a reduced non-fat dry matter content; churning the washed cream to provide buttermilk having a content of phospholipids of at least 3% based on dry matter content, specifically at least 3.8%, more specifically at least 5.0%.

10 Claims, No Drawings

BUTTERMILK

This application is the U.S. national phase of International Application No. PCT/FI2018/050468 filed Jun. 15, 2018 which designated the U.S. and claims priority to FI Patent Application No. 20175566 filed Jun. 16, 2017, the entire contents of each of which are hereby incorporated by reference.

FIELD OF THE INVENTION

The present invention relates to buttermilk obtained as a by-product from butter manufacture, and a method for its preparation. More particularly, the invention relates to buttermilk rich in phospholipids, and a method for its preparation.

BACKGROUND OF THE INVENTION

The beneficial effects of phospholipids on human health have been recognized. For example, enhancement of cognitive developments in infants and promotion of intestinal immunity development are reported. Buttermilk obtained as a by-product from butter-making process has been found to be a suitable source for phospholipid concentration.

Generally, buttermilk is rich in milk fat globular membrane, MFGM, which is a mixture of proteins, phospholipids, glycoproteins, triglycerides, cholesterol, enzyme and other minor components. The concentration of phospholipids is however restricted, in part, since MFGM particle molecular size is similar to casein micelle molecular size.

Morin P et al., Microfiltration of Buttermilk and Washed Cream Buttermilk for Concentration of Milk Fat Globule Membrane Components, J. Dairy Sci. 90:2132-2140, discloses washing of cream wherein cream is diluted with ultrafiltration permeate of skim milk and then separated to produce washed cream and washed buttermilk.

Britten M et al., Effect of cream treatment on phospholipids and protein recovery in butter-making process, International Journal of Food Science and Technology 2008, 43, 651-657, discloses washing of cream wherein cream is diluted with milk UF-permeate and then separated to produce washed cream. An increased ratio of phospholipids to protein in washed buttermilk is reported.

BRIEF DESCRIPTION OF THE INVENTION

The invention provides an efficient method for producing buttermilk in which the ratio of phospholipids to dry matter content of the buttermilk is increased.

It was surprisingly found that the reduction of non-fat dry matter of cream substantially facilitates the concentration of complex lipids in buttermilk and increases the portion of phospholipids in dry matter of buttermilk.

The non-fat dry matter of cream is reduced by washing the cream with a liquid with has low dry matter content. Non-fat dry matter of cream is mainly comprised of protein and lactose. When the washed cream with a reduced non-fat dry matter is churned, a buttermilk with a reduced non-fat dry matter is obtained. Approximately the same amount of fat is retained in buttermilk compared with conventional buttermilk produced from non-washed cream. Thus, buttermilk obtained from washed cream has an increased amount of fat to dry matter compared with conventional buttermilk.

An object of the invention is to provide a method for producing buttermilk, comprising the steps of:
providing raw cream having a fat content in the range of about 35% w/w to about 60% w/w,
washing the raw cream with a washing liquid to provide a solution of the raw cream and the washing liquid,
separating the washing liquid from the solution to provide washed cream with a reduced non-fat dry matter content,
churning the washed cream to provide buttermilk having a content of phospholipids of at least 3% based on dry matter content.

Another object of the invention is to provide buttermilk having a content of phospholipids of at least 3% based on dry matter content.

Still another object of the invention is to provide use of buttermilk of the invention or buttermilk prepared by the method of the invention in the preparation of food products.

A further object of the invention is to provide an infant formula, comprising buttermilk of the invention or buttermilk prepared by the method of the invention.

DETAILED DESCRIPTION OF THE INVENTION

An object of the present invention is to provide a method for producing buttermilk, comprising the steps of:
providing raw cream having a fat content in the range of about 35% w/w to about 60% w/w,
washing the raw cream with a washing liquid to provide a solution of the raw cream and the washing liquid,
separating the washing liquid from the solution to provide washed cream with a reduced non-fat dry matter content,
churning the washed cream to provide buttermilk having a content of phospholipids of at least 3% based on dry matter content, specifically at least 3.8%, more specifically at least 5.0%.

The raw cream used in the method of the invention can be obtained from fresh full-fat raw milk by centrifugal separator commonly employed in the art. The raw cream can also be obtained by microfiltration of fresh full-fat raw milk whereby the raw cream is obtained as a microfiltration retentate.

In the method of the invention, a washing liquid which has a low dry matter content is appropriately used. The expression "washing liquid which has a low dry matter content" means that the dry matter content is less than 5% (w/w). In an embodiment, the dry matter content of the washing liquid is at most of 4% (w/w). In another embodiment, the dry matter content is at most of 1.8% (w/w). In a further embodiment, the dry matter content liquid is at most of 1.0% (w/w). In a still further embodiment, the dry matter content is at most of 0.2% (w/w).

For example, the washing liquid can be water. Moreover, various membrane filtration fractions of a milk-based stream can be used as the washing liquid. The milk-based stream can be, e.g., fresh full fat milk or a milk fraction obtained from processing of fresh milk, such as skimmed milk, whey obtained from cheese manufacture, or buttermilk from butter manufacture. It is commonly known in the art that components of milk, especially protein, lactose and milk minerals, can be separated into different fractions by successive steps of ultrafiltration, nanofiltration and reverse osmosis. Ultrafiltration permeate of milk is protein-depleted and contains lactose and soluble milk minerals. Nanofiltration permeate of the ultrafiltration permeate is protein and lactose-depleted, and contains soluble milk minerals. Reverse osmosis of the nanofiltration permeate substantially removes soluble milk minerals and provides pure water as a permeate fraction. The nanofiltration permeate with low lactose and protein contents, and reverse osmosis permeate have both a low dry matter content and can be suitably used as washing liquid in the method of the invention.

Whey obtained from cheese manufacture contains whey protein, lactose and milk minerals, among others. Suitable membrane filtrations, such as ultrafiltration and/or nanofiltration of whey provide fractions which have a low dry matter content and are suitable as washing liquid in the present invention. Similarly, membrane filtration(s) of buttermilk provide(s) suitable fractions with low dry matter. For example, permeate from ultrafiltration of lactose-depleted buttermilk can be used as washing liquid.

Thus, the composition of the washing liquid has an influence on the composition and dry matter of the buttermilk. In an embodiment, the washing liquid is selected from a group comprising water and a membrane filtration fraction obtained from a membrane filtration of the milk based stream, such as a protein and lactose-depleted nanofiltration permeate, or protein, lactose and milk mineral-depleted reverse osmosis permeate. In an embodiment of the invention, the washing liquid is water.

Addition of a washing liquid to raw cream provides a solution of the raw cream and the washing liquid. After washing, the washing liquid is removed to from the solution to provide washed cream. The removal of the washing liquid can be carried out in appropriate manners. In an embodiment, the washing liquid is separated by a centrifugal separator in a conventional manner. In another embodiment, the washing liquid is separated by microfiltration. The pore size of the microfiltration membrane is suitably in the range of 0.8 μm to 2.0 μm. In an embodiment, the pore size is 1.4 μm. The microfiltration is suitably carried out at a temperature from 40° C. to 60° C. In an embodiment, microfiltration is carried out at about 50° C.

Separation of the washing liquid with a separator and by means of microfiltration is based on different principles. Removal of the liquid with a separator is gravimetric separation whereas removal of the liquid by microfiltration is dependent on properties of a semi-permeable membrane. Thus, the washing of raw cream can be performed differently, depending on the following removal step of the washing liquid, to attain the most efficient washout. For example, when microfiltration is used, the washing liquid is appropriately added in several portions to the raw cream during the washing treatment and not in one portion.

The efficiency of washing treatment depends on the amount of the washing liquid used in the treatment and on the number of washing cycles. The washing/separation steps can be carried out once or several times. Multiple washing procedures enhance washing of the raw cream. The washing liquid can be purified, for example by reverse osmosis filtration. The resultant permeate can be re-used in the washing step. The washing liquids used in multiple washing steps can also be derived from different processes.

In an embodiment of the invention, the raw cream is diluted with a washing liquid by a dilution factor of at least 1:10 w/w. In another embodiment of the invention, the raw cream is diluted with a washing liquid by a dilution factor of at least 1:11 w/w. In a further embodiment of the invention, the raw cream is diluted with a washing liquid by a dilution factor of at least 1:12 w/w. The washing liquid is then separated by a separator. In an embodiment, the washing liquid is water.

In another embodiment, the raw cream is first diluted with a washing liquid by a dilution factor of 1:6 w/w, the washing liquid is separated with a separator, the resultant washed cream is re-diluted with a washing liquid by a dilution factor of 1:5 w/w, and re-separated. The washing/separation cycle can be performed several times, for example one to four times.

In an embodiment, the washing/separation cycle is performed several times, for example one to four times. In an embodiment, the raw cream is diluted with a washing liquid by a dilution factor of 1:2 w/w in total. In an embodiment, the washing liquid is water.

An embodiment of the method of the invention for producing buttermilk comprises the steps of:
  providing raw cream having a fat content of about 40% w/w,
  washing the raw cream with water by diluting the raw cream with water in the ratio of at least 1:10 w/w to provide a solution of the raw cream and water,
  separating water from the solution with a centrifugal separator to provide washed cream with a reduced non-fat dry matter content,
  churning the washed cream to provide buttermilk having a content of phospholipids of at least 3% based on dry matter content, specifically at least 3.8%, more specifically at least 5.0%.

In an embodiment, the raw cream is diluted with water in the ratio of 1:11. In another embodiment, the raw cream is diluted with water in the ratio of 1:12.

Another embodiment of the method of the invention for producing buttermilk comprises the steps of:
  providing raw cream having a fat content of about 40% w/w,
  washing the raw cream with water by diluting the raw cream with water in the ratio of 1:0.5 w/w to provide a solution of the raw cream and water,
  separating water from the solution by microfiltration to provide washed cream with a reduced non-fat dry matter content,
  repeating the washing and separation steps as defined three times,
  churning the washed cream to provide buttermilk having a content of phospholipids of at least 3% based on dry matter content, specifically at least 3.8%, more specifically at least 5.0%.

In an embodiment the method of the invention for producing buttermilk comprises the steps of:
  providing raw cream having a fat content of about 40% w/w,
  washing the raw cream with water by diluting the raw cream with water in the ratio of 1:0.5 w/w to provide a solution of the raw cream and water,
  separating water from the solution by microfiltration to provide washed cream with a reduced non-fat dry matter content,
  repeating the washing and separation steps as defined three times so as to provide a total dilution factor of 1:2,
  churning the washed cream to provide buttermilk having a content of phospholipids of at least 3% based on dry matter content, specifically at least 3.8%, more specifically at least 5.0%.

If desired, the buttermilk obtained by the method of the invention can be concentrated to increase its dry matter content. The buttermilk can be concentrated, for example, by evaporation, reverse osmosis or drying, such as spray drying or lyophilization. Also, various membrane filtrations, such as microfiltration, ultrafiltration, nanofiltration and reverse osmosis filtration can be used for concentration.

The buttermilk prepared by the method of the invention has a ratio of phospholipids to protein of at least 122 mg/g protein. In an embodiment, the ratio of phospholipids to protein is at least 180 mg/g protein. In another embodiment, the ratio of phospholipids to protein is 180 mg/g protein.

The protein content of the buttermilk prepared by the method of the invention, on dry matter basis, is in the range of 9% to 33%. In an embodiment, the protein content is in the range of 17% to 33% on dry matter basis.

The lactose content of the buttermilk prepared by the method of the invention, on dry matter basis, is at most 28%.

Another aspect of the invention is to provide buttermilk having a content of phospholipids of at least 3% based on dry matter content. In an embodiment, the content of phospholipids is at least 3.8%. In another embodiment, the content of phospholipids is at least 5.0%.

The buttermilk of the invention has a ratio of phospholipids to protein of at least 122 mg/g protein. In an embodiment, the ratio of phospholipids to protein is at least 180 mg/g protein. In another embodiment, the ratio of phospholipids to protein is 180 mg/g protein.

The protein content of the buttermilk of the invention, on dry matter basis, is in the range of 9% to 33%. In an embodiment, the protein content of the buttermilk is in the range of 17% to 33% on dry matter basis.

The lactose content of the buttermilk of the invention, on dry matter basis, is at most 28%.

The buttermilk of the invention, having an increased content of beneficial phospholipids, can be used in the preparation of various food products. A further aspect of the invention is to provide use of the buttermilk of the invention or that produced by the method of the invention for the preparation of a food product, such as an infant formula.

The buttermilk can be used in a liquid, concentrated or powdered form. In an embodiment, the buttermilk has a dry matter content of at least 7% up to 100%. Buttermilk rich in phospholipids can be used for example in functional foods, e.g. for aging individuals. An example of the food products are infant formulas. The nutritional composition of the infant formulas is strictly stipulated in legislation, for example in Europe. For instance, total protein content and minimum contents of essential amino acids are regulated. Typically, the infant formula has a protein content in the range from 1.2 g to 1.3 g/100 ml, that is 1.8 g to 2.5 g/100 kcal, a ratio of casein to whey protein of 40/60, and a fat content of 3.5%.

Infant formulas are conventionally prepared from a milk portion and a whey protein portion. The protein and lactose contents of the buttermilk of the invention are reduced compared with conventional butter milk. The protein content of the buttermilk produced by the method of the invention can be adjusted to a level of conventional milk, i.e. in a range of 3% to 4%, by concentration and then used as a milk portion in the preparation of an infant formula.

An object of the invention is to provide use of buttermilk of the invention or buttermilk prepared by the method of the invention in the preparation of food products.

A further object of the invention is to provide an infant formula, comprising buttermilk of the invention or buttermilk prepared by the method of the invention.

The phospholipid content of the infant formula containing buttermilk of the invention has an increased amount of phospholipids compared with conventional infant formula. In an embodiment, the total content of phospholipids is at least 50 mg/100 g infant formula. In another embodiment, the content of phospholipids is 72 mg/100 g infant formula. In an embodiment, the content of phospholipids is 0.8% based on the fat content on the infant formula.

The infant formula of the invention has a total sialic acid content of less than 10 mg/100 g infant formula, specifically less than 5 mg/100 g infant formula. The free sialic acid content of the infant formula of the invention is less than 1.0 mg/100 g infant formula.

In an embodiment, the dry matter content of the infant formula is about 12%.

The following examples are presented for further illustration of the invention without limiting the invention thereto. The percentages are given on weight basis.

Phospholipids of the buttermilk were determined in accordance with the method described in R. Rombaut, J. V. Camp, and K. Dewettinck, Analysis of Phospho- and Sphingolipids in Dairy Products by a New HPLC Method, J. Dairy Sci 88(2) (2005) 482-488.

The following phospholipids were determined: phosphatidylglycerol (PG), phosphatidylinositol (PI), phosphatidylethanolamine (PE), phosphatidylserine (PS), lysophosphatidylethanolamine (LPE), phosphatidylcholine (PC), sphingomyelin (SM) and lysophosphatidylcholine (LPC). The quantities of the phospholipids are given in mg/g of sample.

Free N-acetylneuraminic acid (NANA) and total NANA of the buttermilk were determined in accordance with the method described in D. Hurum and J. Rohrer, Rapid Screening of Sialic Acids in Glycoproteins by HPAE-PAD, Thermo Scientific, Application Update: 181.

EXAMPLES

Reference Example 1

Cream with a fat content of 36% was obtained from full-fat milk by centrifugal separation (Centrifugal Separator, Frau spa Model CN2A). 20 kg of the cream was processed to butter in a conventional manner by ripening the cream at 10° C. for 16 hours and then churned in a laboratory churn to provide butter and buttermilk.

The composition of the cream, butter and buttermilk obtained are shown in Table 1.

TABLE 1

|  | Cream | Conventional Butter | Conventional Buttermilk |
|---|---|---|---|
| Protein (%) | 1.9 | 0.6 | 3.1 |
| Fat (%) | 40 | 82 | 0.6 |
| Lactose (%) | 2.4 | 0.8 | 4.2 |
| Ash (%) | 0.3 | 0.4 | 1.1 |
| Dry matter (%) | 44.6 | 83.8 | 9.0 |
| Non-fat dry matter (%) | 4.6 | 1.8 | 8.4 |
| Protein/fat | 0.05 | 0.01 | 5.17 |
| Lactose/fat | 0.06 | 0.01 | 7.0 |

The buttermilk was dried to powder and used in the preparation of an infant formula of Example 5.

Example 1. Buttermilk Production from Cream Washed with Water

Cream with a fat content of 40% was obtained from full-fat milk by centrifugal separation (Centrifugal Separator, Frau spa Model CN2A). 10 kg cream was diluted with 110 kg water. The mixture of cream and water was heated to 55° C. and separated with the above separator to produce washed cream and washing water.

The washed cream was pasteurized at 85° C. for 20 sec and then ripened at 10° C. for 16 hours. The cream was then churned in a laboratory churn for 10 minutes into buttermilk and butter. Buttermilk was separated from butter grains.

Buttermilk was concentrated by Rotavapor until a dry matter of 7.90% was achieved.

The compositions of the products obtained in the above different steps are given in Table 2.

TABLE 2

|  | Dry matter (%) | Fat (%) | Non-fat dry matter (%) | Protein (%) | Lactose (%) |
|---|---|---|---|---|---|
| Cream | 44.6 | 40.0 | 4.6 | 1.98 | 2.5 |
| Mixture of cream and water | 3.7 | 2.9 | 0.8 | 0.1 | 0.2 |
| Washed cream | 25.9 | 25.4 | 0.5 | 0.2 | 0.14 |
| Washing water | 0.66 | 0.03 | 0.63 | 0.23 | 0.34 |
| Butter | 84.8 | 84.6 | 0.2 | 0.23 | 0.02 |
| Buttermilk | 0.68 | 0.24 | 0.44 | 0.20 | 0.18 |
| Conc. buttermilk | 7.90 | 2.89 | 5.01 | 2.29 | 2.13 |

The results show that a substantial portion of protein and lactose are removed from a cream raw material by washing. Thus, the non-fat dry matter of the washed cream is lower compared with that of the cream raw material. Consequently, also the non-fat dry matter of the concentrated buttermilk obtained from the washed cream is substantially lower than that of conventional buttermilk at about the same dry matter content.

Phospholipids of the buttermilk from the washed cream are shown in Table 6.

Example 2. Buttermilk Production from Cream Washed with NF Permeate

Cream with a fat content of 40% was obtained from full-fat milk by centrifugal separation (Centrifugal Separator, Frau spa Model CN2A). 10 kg cream was diluted with 100 kg nanofiltration (NF) permeate. The NF permeate had a lactose content of 0.04% and a dry matter content of 0.3%. The mixture of cream and the NF permeate was heated to 55° C. and separated with the above separator to produce washed cream and washing water.

The washed cream was pasteurized at 85° C. for 20 sec and then ripened at 10° C. for 16 hours. The cream was then churned in a laboratory churn for 10 minutes into buttermilk and butter. Buttermilk was separated from butter grains.

The compositions of the products obtained in the above different steps are given in Table 3.

TABLE 3

|  | Dry matter (%) | Fat (%) | Non-fat dry matter (%) | Protein (%) | Lactose (%) |
|---|---|---|---|---|---|
| Cream | 44.2 | 39.4 | 4.8 | 1.94 | 2.8 |
| Washed cream | 31.8 | 31.3 | 0.5 | 0.30 | 0.19 |
| Washing water | 0.5 | 0.04 | 0.5 | 0.19 | 0.27 |
| Butter | 85.4 | 85.1 | 0.3 | 0.22 | 0.04 |
| Buttermilk | 1.0 | 0.4 | 0.6 | 0.33 | 0.27 |

The results show that a substantial portion of protein and lactose are removed from a cream raw material by washing with NF permeate. Thus, the non-fat dry matter of the washed cream is lower compared with that of the cream raw material. Consequently, also the non-fat dry matter of the concentrated buttermilk obtained from the washed cream is substantially lower than that of conventional buttermilk at about the same dry matter content.

Example 3. Buttermilk Production from Cream Washed with Water

Cream with a fat content of 40% was obtained from full-fat milk by centrifugal separation (Centrifugal Separator, Frau spa Model CN2A). 10 kg cream was diluted with 100 kg water. The mixture of cream and water was heated to 55° C. and separated with the above separator to produce washed cream and washing water.

The washed cream was diluted again with water ten times the weight of the washed cream. The mixture of cream and water was heated to 55° C. and separated with the above separator to produce washed cream and washing water.

The two times washed cream was diluted again with water ten times the weight of the washed cream. The mixture of cream and water was heated to 55° C. and separated with the above separator to produce washed cream and washing water.

The three times washed cream was pasteurized at 85° C. for 20 sec and then ripened at 10° C. for 16 hours. The cream was then churned in a laboratory churn for 10 minutes into buttermilk and butter. Buttermilk was separated from butter grains.

The compositions of the products obtained in the above different steps are given in Table 4.

TABLE 4

|  | Dry matter (%) | Fat (%) | Non-fat dry matter (%) | Protein (%) | Lactose (%) |
|---|---|---|---|---|---|
| Cream | 46.2 | 41.3 | 4.9 | 1.95 | 2.80 |
| Washed cream | 47.7 | 47.5 | 0.2 | 0.21 | 0.00 |
| Washing water | 0.0 | 0.0 | 0.0 | 0.03 | 0.00 |
| Butter | 82.6 | 82.4 | 0.18 | 0.18 | 0.00 |
| Buttermilk | 1.4 | 1.15 | 0.2 | 0.24 | 0.00 |

The results show that intense washing of a cream raw material performed in this example removes a substantial portion of protein and lactose from the cream raw material. Thus, the non-fat dry matter of the washed cream is lower compared with that of the cream raw material. Consequently, also the non-fat dry matter of the concentrated buttermilk obtained from the washed cream is substantially lower than that of conventional buttermilk at about the same dry matter content.

Example 4. Buttermilk Production from Cream Washed with Water

Cream with a fat content of 40% was obtained from full-fat milk by centrifugal separation (Centrifugal Separator, Frau spa Model CN2A). 20 kg cream was diluted with 10 kg water. The mixture of cream and water was heated to 50° C., whereafter water was removed by microfiltration with a membrane pore size of 1.4 μm. When 10 kg of microfiltration permeate was collected, the same dilution procedure was carried out by diluting the microfiltration retentate with 10 kg water. The washing/separation cycle was still carried out twice so that cream was diluted with 40 kg of water in total. Protein and lactose of cream were washed into the microfiltration permeate while fat was retained in the microfiltration retentate.

The final microfiltration retentate, i.e. washed cream, was pasteurized at 85° C. for 20 sec and then ripened at 10° C. for 16 hour. The cream was then churned in a laboratory churn for 10 minutes into buttermilk and butter. Buttermilk was separated from butter grains.

Buttermilk was concentrated by Rotavapor until a dry matter content of 11.75% was achieved.

The composition of the concentrated buttermilk of the washed cream is given in Table 5.

TABLE 5

|  | Dry matter (%) | Fat (%) | Non-fat dry matter (%) | Protein (%) | Lactose (%) |
|---|---|---|---|---|---|
| Conc. buttermilk | 11.75 | 5.46 | 6.29 | 3.79 | 1.28 |

The results show that protein and lactose are removed from a cream raw material by a multistep washing whereby buttermilk with a reduced protein and lactose content compared with conventional buttermilk is achieved. Especially, the lactose content of the buttermilk is significantly reduced.

The various phospholipids of the conventional buttermilk and the buttermilks of the invention are summarized in Table 6. The buttermilks were lyophilized to powder. Powdered samples were reconstituted in water (1% w/w) for the determination of the phospholipid content.

TABLE 6

|  | PE mg/g | PG mg/g | LPE mg/g | PC mg/g | SM mg/g | PS mg/g | LPC mg/g | PI mg/g | Total mg/g | Total/ DM % | Total/ fat % | Total/ protein mg/g |
|---|---|---|---|---|---|---|---|---|---|---|---|---|
| Conventional buttermilk; Ref. Ex. 1 | 5.5 | nd | 0.8 | 4.4 | 3 | 3.3 | nd | 1.8 | 18.8 | 1.94 | 28 | 60 |
| Buttermilk; Ex. 1 | 14.1 | nd | 2.3 | 12 | 6.4 | 11.4 | nd | 5 | 51.1 | 5.29 | 15 | 122 |
| Buttermilk; Ex. 4 | 9.6 | nd | 1.8 | 9.9 | 4.5 | 9 | nd | 3.1 | 37.8 | 3.88 | 8.5 | 180 | nd = not determined

The results show that the total content of phospholipids of the buttermilk powders of the invention is higher than that of conventional buttermilk powder.

The content of sialic acid, i.e. N-acetylneuraminic acid (NANA), of the conventional buttermilk and the buttermilks of the invention was measured. The buttermilk were lyophilized to powder for the determination of the sialic acid content. Powdered samples were reconstituted in water (1% w/w) for the determination of sialic acid content. The contents are summarized in Table 7.

TABLE 7

|  | Total NANA mg/g | Free NANA mg/g | Total NANA/DM % | Free NANA/DM % |
|---|---|---|---|---|
| Conventional buttermilk; Ref. Ex. 1 | 2.59 | 0.30 | 0.267 | 0.0309 |
| Buttermilk; Ex. 1 | 2.49 | 0.11 | 0.258 | 0.0114 |
| Buttermilk; Ex. 4 | 1.85 | 0.05 | 0.189 | 0.051 |

The sialic acid content is lower in the buttermilks of the invention compared with conventional buttermilk. This is because a major portion of sialic acid is bound to lactose and protein, and a minor portion is bound to fat. Since lactose and protein are removed from the buttermilk of invention, also a portion of sialic acid is removed.

Example 5

The concentrated buttermilk of the invention prepared in Example 1 was used in the preparation of an infant formula.

1,000 kg of an infant formula was prepared in accordance with the recipe given in Table 8.

The infant formula designated as "invention" was produced from the above concentrated buttermilk of Example 1 of the present invention. For comparison, two reference infant formulas were prepared; one was produced from skim milk and the other from buttermilk powder obtained from conventional butter manufacture described in Reference Example 1.

The phospholipids and sialic acid content of the infant formulas are given in Table 9.

TABLE 8

Infant formula compositions

| Ingredient (%) dry matter | Skim milk | Buttermilk powder | Invention |
|---|---|---|---|
| Whey protein solids | 9.41 | 9.35 | 9.65 |
| Lactose solids | 39.98 | 39.66 | 40.99 |

TABLE 8-continued

Infant formula compositions

| Ingredient (%) dry matter | Skim milk | Buttermilk powder | Invention |
|---|---|---|---|
| Lactose concentrate solids | 11.46 | 11.39 | 11.75 |
| Skim milk solids | 5.62 | — | — |
| Buttermilk powder | — | 6.48 | — |
| Conc. buttermilk solids | — | — | 6.75 |
| Cream solids | 15.09 | 15 | 13.75 |
| Vegetable oil solids | 13.31 | 13.98 | 12.86 |
| Vitamins and mineral solids | 2.81 | 2.87 | 2.94 |

The dry ingredients were mixed. Water was added to provide 1000 kg of infant formula.

The three infant formulas of Table 8 have an energy content of 67 kcal/100 ml, a protein content of 1.2 g/100 g, a fat content of 3.5 g/100 g and a lactose content of 7.3 g/100 g. The infant formulas comply with the requirements set forth in EU Directive No 609/2013 for infant formulas.

TABLE 9

| | Phospholipids mg/100 g infant formula | | | | | | | | | Phospholipids in fat (%) | Sialic acid mg/100 g | |
|---|---|---|---|---|---|---|---|---|---|---|---|---|
| | PE | PG | LPE | PC | SM | PS | LPC | PI | Total | | Total NANA | Free NANA |
| Skim milk | 2.9 | nd | 2.3 | 11.9 | 4.9 | 2.1 | nd | 6.1 | 29.7 | 2 | 3.8 | 0.8 |
| Buttermilk powder | 2 | nd | 1 | 3 | 3 | 2 | nd | 2 | 13 | 0.37 | 9 | 1 |
| Invention | 14.8 | nd | 4.0 | 24.3 | 8.8 | 11.1 | nd | 9.8 | 72.7 | 0.8 | 4.7 | 0.6 |

The results show that the total phospholipid content of the infant formula prepared from the buttermilk of the invention is significantly higher than that of reference infant formulas. The total sialic acid of an infant formula of the invention is less than 10 mg/100 g of infant formula.

It will be obvious to a person skilled in the art that, as the technology advances, the inventive concept can be implemented in various ways. The invention and its embodiments are not limited to the examples described above but may vary within the scope of the claims.

The invention claimed is:

1. A method for producing buttermilk, comprising the steps of:
   providing raw cream having a fat content in the range of about 35% w/w to about 60% w/w,
   washing the raw cream with a washing liquid to provide a solution of the raw cream and the washing liquid,
   separating the washing liquid from the solution to provide washed cream with a reduced non-fat dry matter content, and
   churning the washed cream to provide buttermilk having a content of phospholipids of at least 3% based on dry matter content.

2. The method of claim 1, wherein the washing liquid is obtained from a membrane filtration of a milk-based stream.

3. The method of claim 1, wherein the washing liquid has a dry matter content of less than 5% (w/w).

4. The method of claim 1, wherein the washing liquid is separated by a centrifugal separator or by microfiltration.

5. The method of claim 1, wherein washing the raw cream with a washing liquid and separating the washing liquid from the solution is carried out one or several times.

6. The method of claim 1, comprising the steps of:
   providing raw cream having a fat content of about 40% w/w,
   washing the raw cream with water by diluting the raw cream with water in the ratio of at least 1:10 w/w to provide washed cream with a reduced non-fat dry matter content,
   separating water from the washed cream with a centrifugal separator, and
   churning the washed cream to provide buttermilk having a content of phospholipids of at least 3% based on dry matter content.

7. The method of claim 6, wherein the raw cream is diluted with water in the ratio of at least 1:11.

8. The method of claim 1, comprising the steps of:
   providing raw cream having a fat content of about 40% w/w,
   washing the raw cream with water by diluting the raw cream with water in the ratio of 1:0.5 w/w to provide a solution of the raw cream and water,
   separating water from the solution by microfiltration to provide washed cream with a reduced non-fat dry matter content,
   repeating the washing and/or separation steps as defined three times, and
   churning the washed cream to provide buttermilk having a content of phospholipids of at least 3% based on dry matter content.

9. The method of claim 1, wherein the buttermilk has a ratio of phospholipids to protein of at least 122 mg/g protein.

10. The method of claim 1, wherein the buttermilk has a protein content on a dry matter basis in the range of 9% to 33%.

* * * * *